Figure 4:
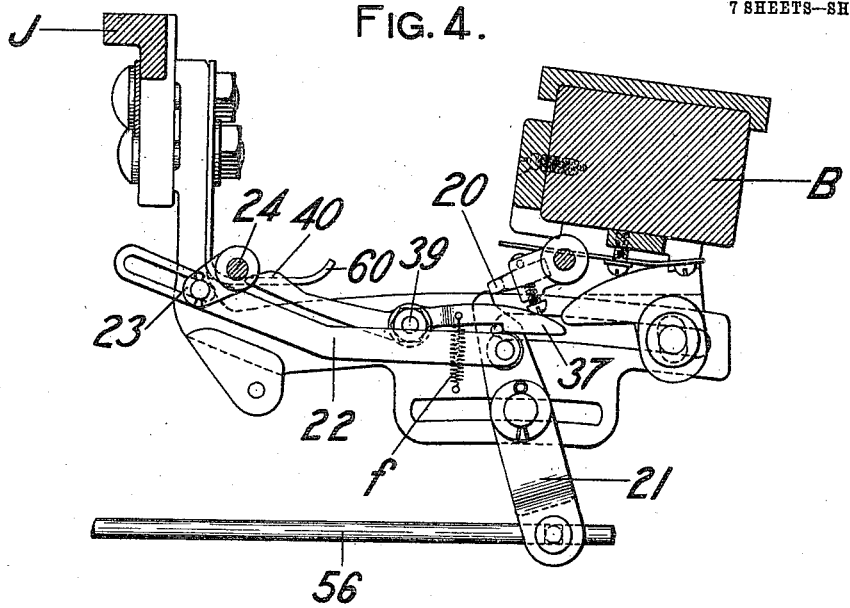

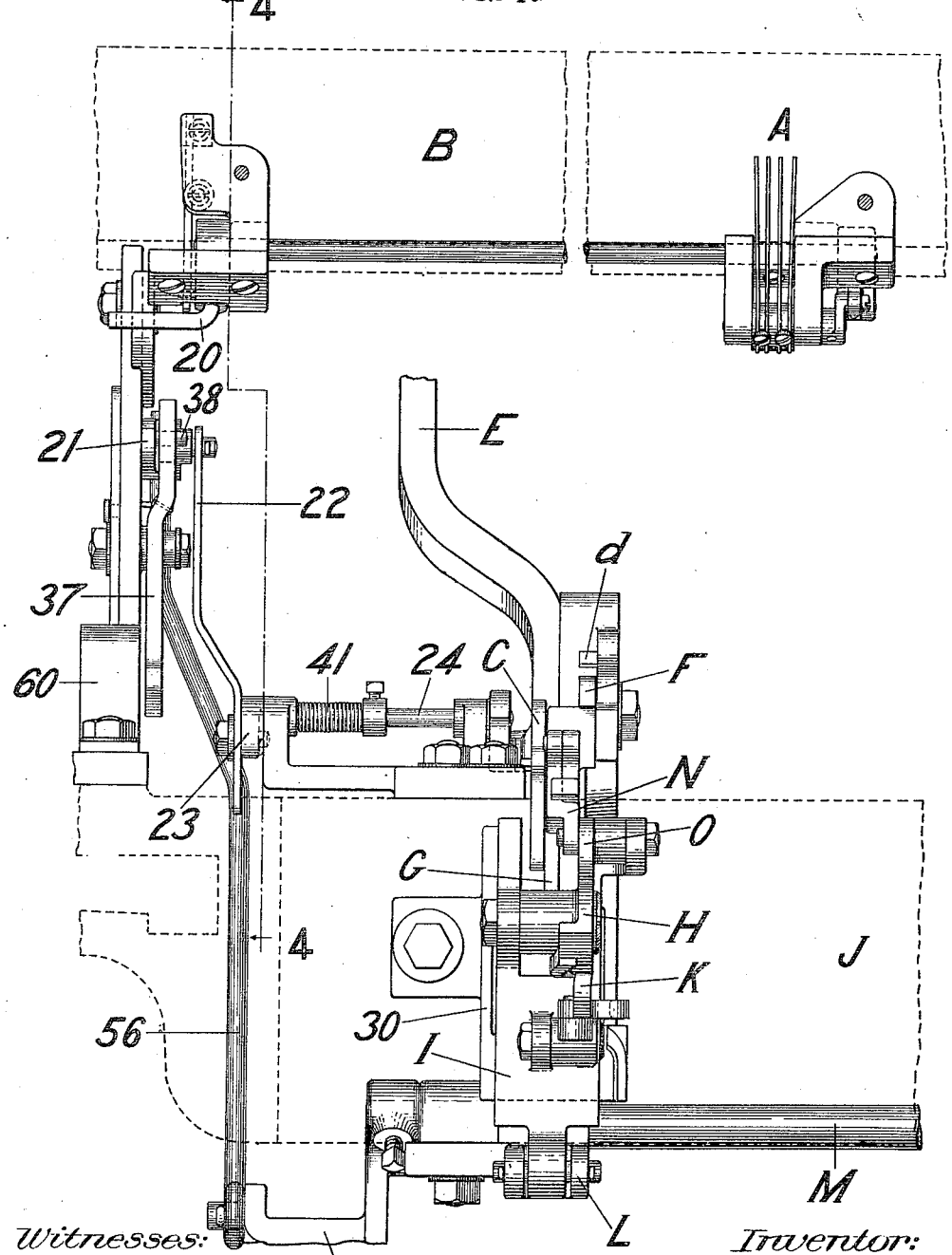

A. E. RHOADES.
PICK MATCHER FOR AUTOMATIC WEFT REPLENISHING LOOMS.
APPLICATION FILED JULY 27, 1908.
964,555.
Patented July 19, 1910.
7 SHEETS—SHEET 2.
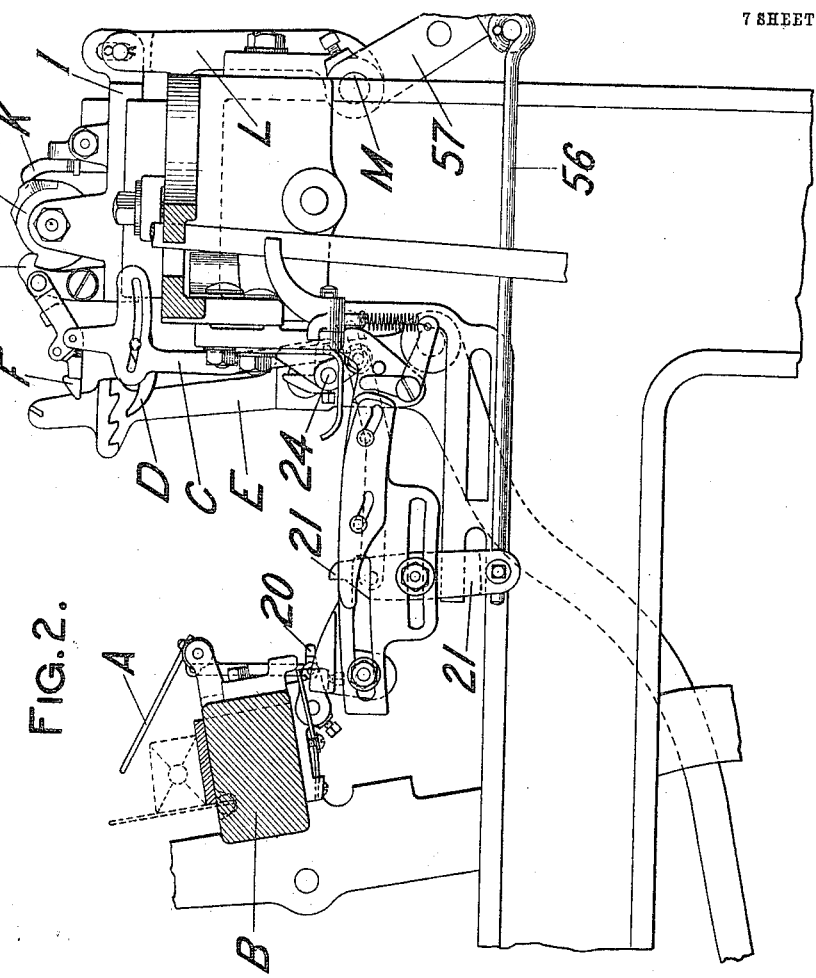
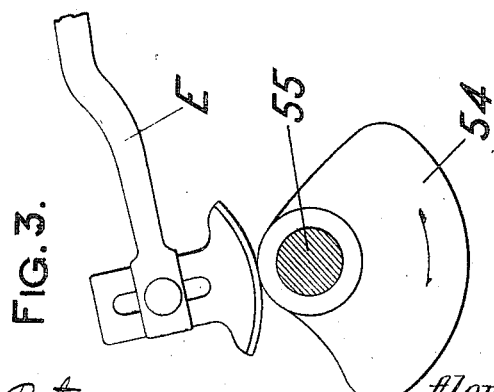
Witnesses:
Frank A. Peters
Jos. D. Latimer
Inventor:
Alonzo E. Rhoades.
by his Attorney A. E. RHOADES.
PICK MATCHER FOR AUTOMATIC WEFT REPLENISHING LOOMS.
APPLICATION FILED JULY 27, 1908.

964,555.

Patented July 19, 1910.

7 SHEETS—SHEET 3.

Witnesses:
Frank J. Peters.
Jas. S. Latimer.

Inventor:
Alonzo E. Rhoades.
by his Attorney Arthur F. Brown

A. E. RHOADES.
PICK MATCHER FOR AUTOMATIC WEFT REPLENISHING LOOMS.
APPLICATION FILED JULY 27, 1908.
964,555.
Patented July 19, 1910.
7 SHEETS—SHEET 4.
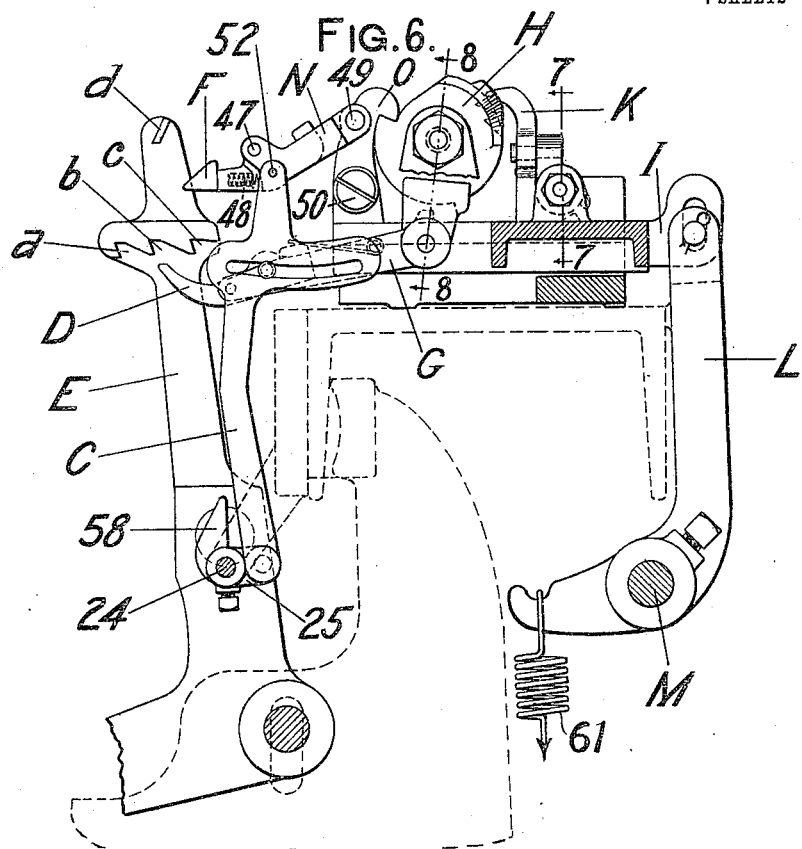
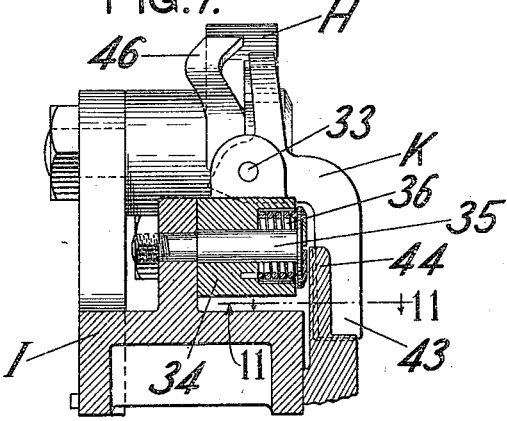
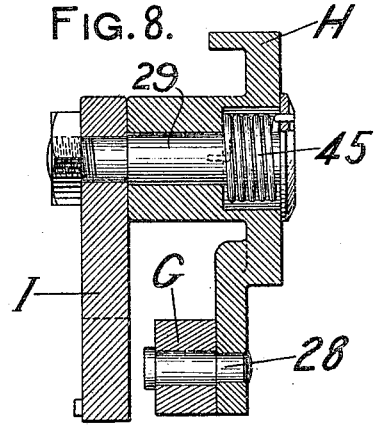
Witnesses:
Frank A. Peters
Jas. S. Latimer
Inventor:
Alonzo E. Rhoades.
by his Attorney Arthur L. Browne

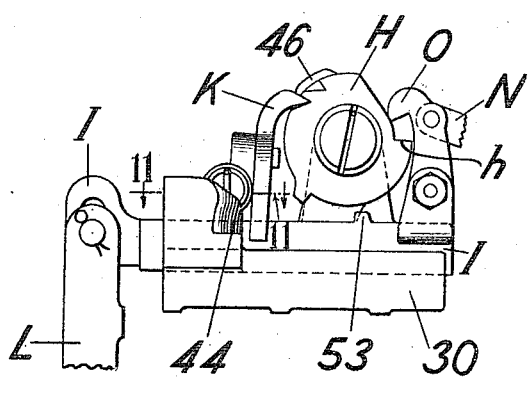
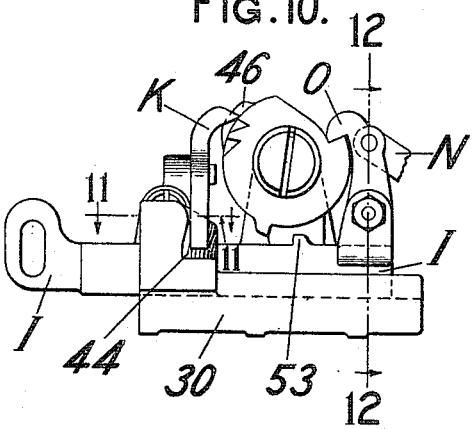
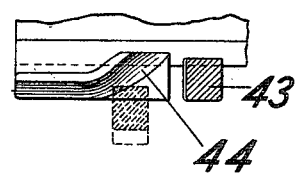
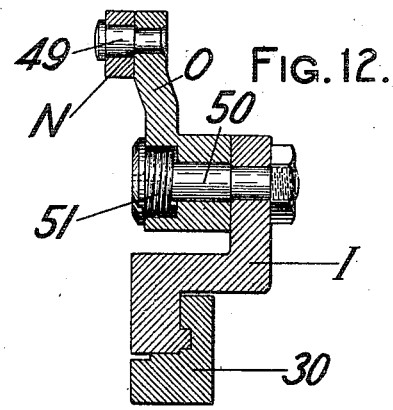
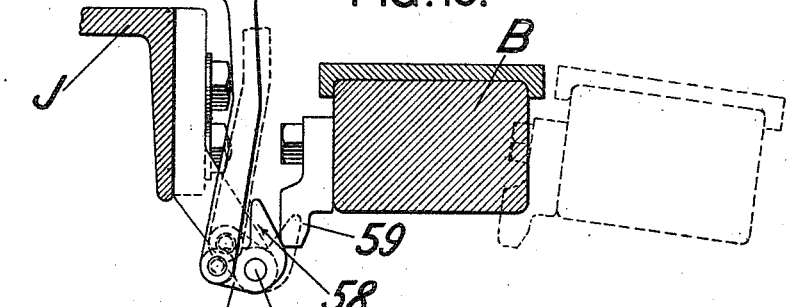

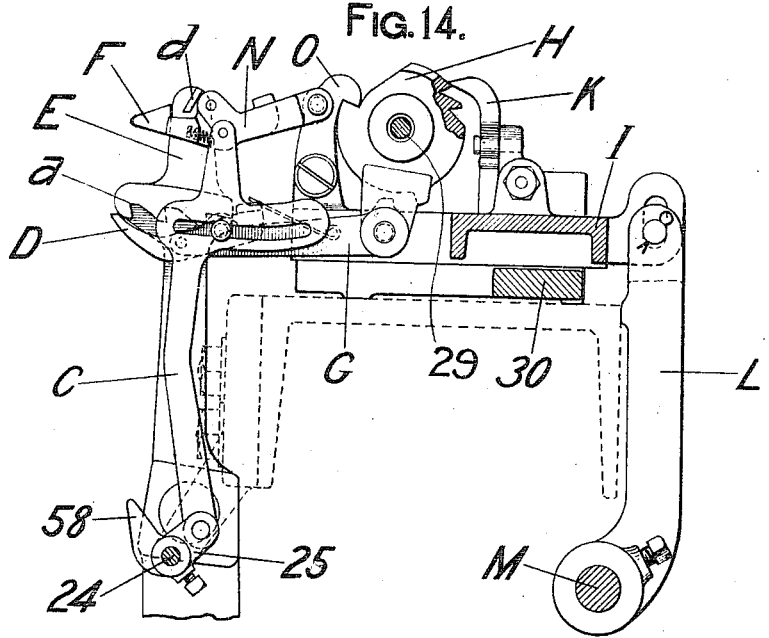
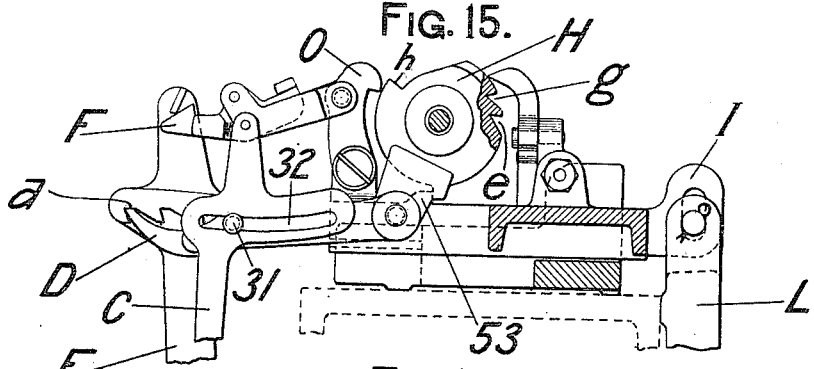
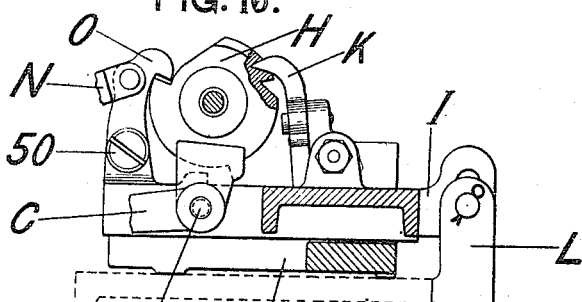

A. E. RHOADES.
PICK MATCHER FOR AUTOMATIC WEFT REPLENISHING LOOMS.
APPLICATION FILED JULY 27, 1908.

964,555.

Patented July 19, 1910.

7 SHEETS—SHEET 7.

Witnesses:
Frank A. Peters
Jas. S. Latimer

Inventor:
Alonzo E. Rhoades.
by his Attorney Arthur S. Browne

UNITED STATES PATENT OFFICE.

ALONZO E. RHOADES, OF HOPEDALE, MASSACHUSETTS, ASSIGNOR TO DRAPER COMPANY, OF HOPEDALE, MASSACHUSETTS, A CORPORATION OF MAINE.

PICK-MATCHER FOR AUTOMATIC WEFT-REPLENISHING LOOMS.

964,555.   Specification of Letters Patent.   Patented July 19, 1910.

Application filed July 27, 1908. Serial No. 445,580.

*To all whom it may concern:*

Be it known that I, ALONZO E. RHOADES, residing at Hopedale, in the county of Worcester and State of Massachusetts, have invented a new and Improved Pick-Matcher for Automatic Weft-Replenishing Looms, of which the following is a specification.

With automatic weft-replenishing looms, such as that set forth in United States Letters Patent of James H. Northrop, No. 529,940, November 27, 1894, wherein the weft is automatically replenished when the running weft thread breaks or is exhausted, it is desirable in weaving some classes of fabrics that the pick should be matched; that is to say, the first strand of the fresh weft should be laid in the same shed as that which was formed when the running weft failed. Various mechanisms have already been devised for thus matching the pick in automatic weft-replenishing looms, but they involve the employment of two independent weft-forks at opposite sides of the loom in order to effect the desired result.

In accordance with the present improvement a single detector or weft-fork is employed, and while the result may occasionally be to leave a partial pick in a shed, yet this partial pick in all cases where it occurs will extend more than half the width of the cloth, which is a sufficiently close approximation to exact matching of the pick in the weaving of some classes of fabrics.

In accordance with the present improvements, the single weft detector is a center weft fork acting among and at the middle of the warp threads. This center fork coöperates with a single double-acting weft-hammer and with suitable differential delaying mechanism so that the shuttle will always be at the supply side of the loom when the replenishment occurs irrespective of the direction in which the shuttle was traveling at the time the failure of weft occured. This differential delaying mechanism is coördinated with the shedding mechanism or harness motion of the loom so that the first pick of fresh weft is laid in the shed which was open at the time the center fork detected weft absence.

In the accompanying drawings there is illustrated one embodiment of the present improvements in connection with an automatic weft-replenishing loom of the Northrop type in which there is a magazine for spare weft-carriers at one side only of the loom and in which there are three harnesses which progress regularly and without any abnormal action by reason of the presence of the pick-matching mechanism, and in which the shuttle is picked back and forth regularly between detection of weft-absence and the action of the controlling means for the replenishing devices. Such shedding and weft-supplying mechanisms are assumed for convenience in description and illustration of the improvements. The improvements in many aspects are applicable to other forms of weft-replenishing mechanism, and are also applicable to any loom having an odd number of harnesses which progress regularly when the loom is running.

Figure 5:
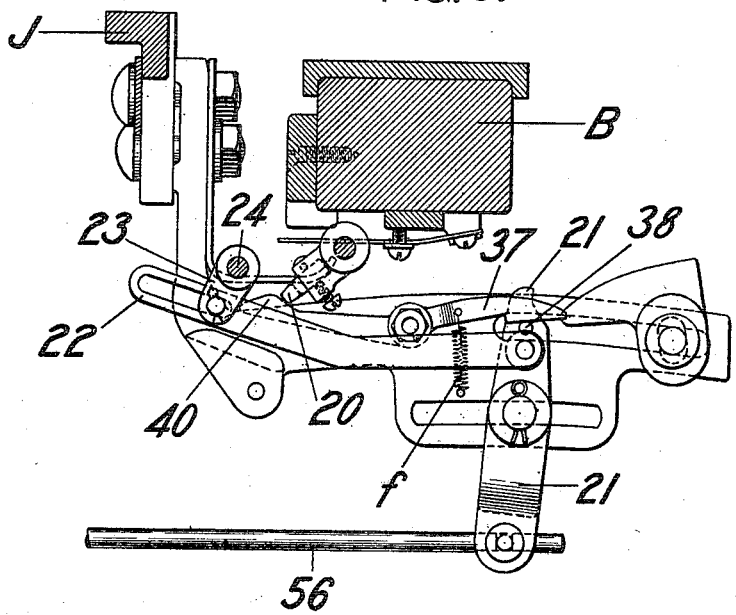

In the drawings—Figure 1 is a plan view of so much of an automatic weft-replenishing loom as is necessary for the elucidation of the present improvements. Fig. 2 is a side view, partly in section, of sufficient parts of a loom for an understanding of the improvements, this being a view of the "setting on" side of the loom, the weft supply being at the opposite side of the loom. Fig. 3 is a detail view of the cam which actuates the weft-hammer. Fig. 4 is a vertical section in the plane indicated by the line 4—4 in Fig. 1 and illustrating the lay as having moved part way forward. Fig. 5 is a similar section in the same plane illustrating the lay all the way forward. Fig. 6 is a vertical section across the breast-beam of the loom illustrating the differential delaying mechanism in side elevation. Fig. 7 is a detail vertical section in the plane indicated by the line 7—7 in Fig. 6. Fig. 8 is a detail vertical section in the plane indicated by the line 8—8 in Fig. 6. Figs. 9 and 10 are detail side views of parts of the differential delaying mechanism, the side shown in these figures being opposite to that shown in Fig. 6. Fig. 11 is a detail horizontal section in the plane indicated by the line 11—11 in Figs. 7 and 9. Fig. 12 is a detail vertical section in the plane indicated by the line 12—12 in Fig. 10. Fig. 13 is a detail vertical cross-section through the lay and a portion of the breast-beam, illustrating the connecting link which connects the rocking starting shaft with the differentially acting parts which directly coöperate with the weft-hammer. Figs. 14, 15, 16, 17, 18 and 19 are vertical cross-sections through the breast-beam showing the differential delaying mechanism in side elevation, these several views illustrating the different positions which the parts of the differential mechanism occupy at different stages of the operation.

A is a center fork (Figs. 1 and 2) of known type which is carried by the lay B at its middle so as to work among the warp threads at their middle. The illustrated weft fork and its adjuncts (except so far as modified in accordance with the present improvements, as will be hereinafter set forth) are similar to the center fork and its adjuncts set forth in application for Letters Patent of Great Britain of the British Northrop Loom Company, Limited, Number 6, dated January 1, 1909. Like in that patent, the center fork acts to detect weft absence during the first portion of the forward movement of the lay, and hence, just after the shuttle has passed it during its flight through the shed in either direction. In case the center fork detects weft absence the dagger 20 (Figs. 1 and 2) controlled thereby encounters the upper end of a centrally pivoted lever 21, thereby carrying said upper end forward and hence swinging said lever on its pivot. This lever is connected by a link 22 (Figs. 1, 4 and 5) with a crank arm 23 on a rocking shaft 24, and the forward swing of the upper end of lever 21 thus rocks said shaft. This shaft extends horizontally and beneath the inner portion of the differential delaying mechanism and at its inner end this shaft has a crank arm 25 (Fig. 6) from which rises an actuator C. The center fork detects weft absence no matter in which way the shuttle is traveling when the weft fails, and in any event the starting shaft 24 is rocked and the actuator C is lifted. The effect of the lifting of this actuator C is to lift a dog D and a hook F into coöperative relation with a weft-hammer E. In case the weft fails while the shuttle is traveling toward the supply side of the loom and before the center fork is reached, the dog D is operatively connected with the weft-hammer and the hook F remains idle. On the other hand, if the weft fails when the shuttle is traveling in the opposite direction and before the center fork is reached, then the hook F is operatively connected with the weft-hammer. This relative selective action between the weft-hammer and the hook and dog is due to the circumstance that the hammer makes a single complete back and forth reciprocation during two picks of the shuttle and two complete reciprocations of the lay, this resulting from the fact (customary with weft hammers) that it is actuated by a cam 54 on the cam shaft 55 of the loom, as shown in Fig. 3. Hence, the weft-hammer occupies different positions when the shuttle is traversing in opposite directions, and this circumstance is utilized in determining whether the dog D or the hook F shall first be operative.

The differential delaying mechanism will be described in connection with two of the specific cases which may arise and, first, will be considered the action which takes place when the center fork detects during the flight of the shuttle toward the supply side of the loom (which is the opposite side from that where the differential mechanism is located) and when the shuttle thread runs out before the shuttle passes the center fork. In that case when the actuator C is lifted the weft-hammer is moving forward and occupies substantially the position shown in Fig. 6. The weft-hammer has three notches, $a$, $b$, and $c$, and the weft-hammer is then in such position that the dog D is lifted so as to engage the middle notch $b$, with the result that the dog D is carried forward during the remaining portion of the forward stroke of the weft-hammer.

Figure 19:
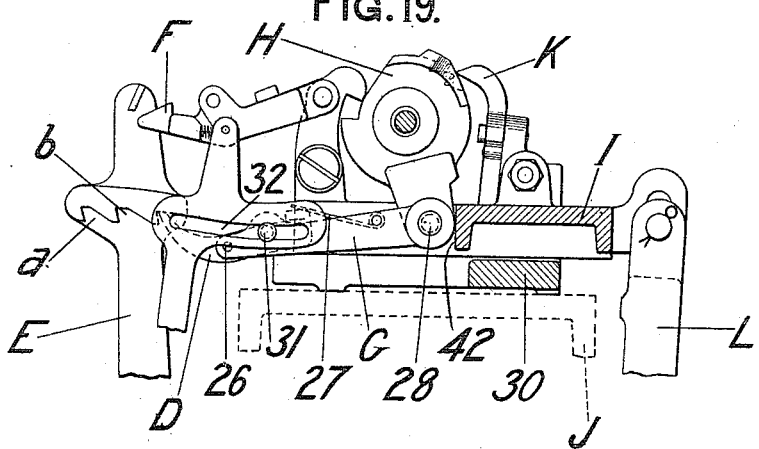

The dog D is pivoted at 26 (as best shown in Fig. 19) to a coupler G, being yieldingly held thereto by the flat spring 27. The coupler G has a laterally projecting pin 31 (Figs. 13 and 19) which enters a curved slot 32 in the actuator C, this slot permitting the forward and back movement of the dog D and actuator G relatively to the actuator C. This pin 31 is shown in section in Fig. 13. With this construction whenever the actuator C is lifted the dog D will be lifted into coöperative relation with the weft-hammer.

The coupler G is pivoted at 28 (Fig. 19) to an oscillating ratchet H which is rotatively journaled at 29 (Figs. 8 and 14) on a slide I. This slide I slides back and forth in a fixed guide-stand 30 which is fast on the breast-beam J. This slide is pivotally connected at its forward end to the upper end of an arm L (Fig. 6) which is fast at its lower end to the rocking change shaft M. This change shaft is that commonly employed in the Northrop loom. When it is rocked it brings about the insertion of a fresh weft-carrier in the working shuttle and the concurrent ejection of the spent weft-carrier. This weft-replenishing mechanism is now so well known that no illustration or description is considered necessary. The change shaft M itself is a sufficient conventional representation of this weft-replenishing mechanism. Such mechanism is shown, for example, in the Northrop Patent No. 529,940 heretofore mentioned. The change-shaft constitutes the controlling means for the replenishing instrumentalities. Hence, whenever the slide I is moved forward the change shaft M is rocked and the weft-supply mechanism is put into action. The slide I is restored to its normal rearward position and normally maintained therein by means of the spring 61 which acts on the change shaft as shown in Fig. 6, this spring being the customary spring for that purpose in the Northrop loom.

Figure 17:
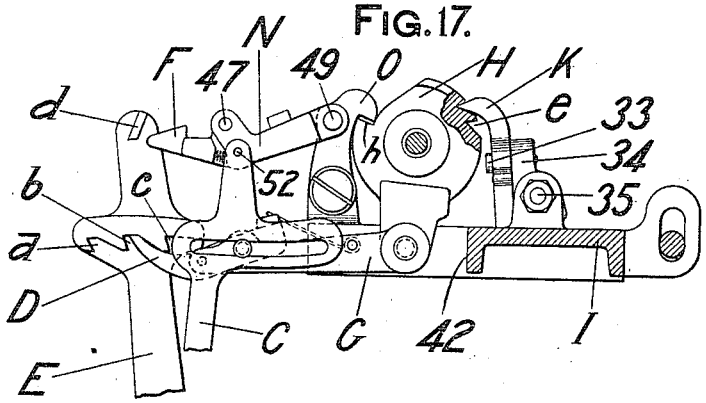
Figure 18:
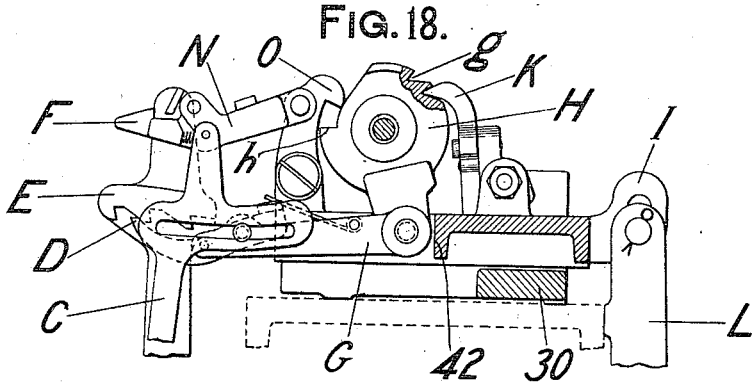

The oscillating ratchet H has a series of notches, there being two such notches $e$ and $g$ (Figs. 17 and 18) in the present embodiment of the invention which is designed for a three harness loom. These notches coöperate with a pawl K. This pawl has a double swing, being adapted to swing laterally on pivot 33 (Fig. 17) and back and forth on pivot 35. To this end the pawl K is pivoted at 33 to a rocker 34 and the rocker in turn pivoted at 35 to the slide I, as best seen in Figs. 7 and 17. A spring 36 (Fig. 7) presses the rocker 34, and hence the pawl K, toward the oscillating ratchet H. The pawl K is swung laterally on its horizontal pivot 33 in one direction by a stationary cam 44 (Figs. 7, 9, 10 and 11) on the fixed guide-stand 30, and in the other direction by a cam 46 (Fig. 7) on the oscillating ratchet H. The pawl has a tail 43 which extends down into the plane of the fixed cam 44, as shown in Figs. 7, 9 and 10. Normally, the tail 43 is back of the cam 44, as shown in Fig. 9. When, however, the slide I moves forward to effect weft-replenishment, the tail 43 encounters the cam 44, as shown in Figs. 10 and 11, thus rocking the pawl in one direction so as to disengage it from the tooth $e$ or $g$ of the ratchet H which it may have occupied. Then, on the swing of the ratchet H to the rear after the pawl tail is free of the fixed cam 44, the cam 46 restores pawl K to its normal position, which is shown in Figs. 6 and 7. In this position, the pawl rests on the outer periphery of the ratchet as shown in Figs. 7 and 14.

Coming back now to the action which takes place when the dog D is lifted into the notch $b$ of the forwardly moving weft-hammer: During the further forward movement of the weft-hammer the dog D and coupler G are swung forward, thereby rocking the ratchet H until it occupies the position shown in Fig. 9, in which position the pawl K engages the notch $e$ of the ratchet H and holds it there against the stress of its spring 45. This spring 45 tends to rock the ratchet H in the direction opposite to the movement of the hands of a watch when looking at the side of the ratchet shown in Figs. 9 and 10. Accordingly, the dog D is maintained in the forward position to which it has been moved by the weft-hammer on its first forward stroke following detection of weft absence. The weft-hammer then moves all the way back and then forward a second time. During this interim the empty shuttle is picked back and forth through the shed and each time the center fork acts and hence lifts the actuator C and consequently the dog D. But, on this second forward movement of the weft-hammer, the dog D occupies a position farther forward, due to the pawl K engaging the notch $e$ in the ratchet H; and, therefore, this time the dog D engages the forward notch $c$ of the weft-hammer. Hence, a portion of the forward movement of the weft-hammer is expended in pushing the dog D forward. In this case, however, no further swing can be imparted to the ratchet H because the coupler G abuts against a shoulder 42 (see Fig. 19) on the slide I, with the result that the weft-hammer as it moves forward after engaging the dog D in its notch $c$ moves the slide I forward, thereby rocking the change shaft M and hence supplying fresh weft to the loom. This action, it will be noted, requires two forward movements of the weft-hammer following the detection of weft absence by the center fork when such weft absence occurs with the shuttle moving toward the supply side of the loom. This delay is sufficient to enable the empty shuttle to make two excursions across the lay. At pick number 1 the shuttle (in the assumed instance) was traveling toward the supply side of the loom when detection occurred. Picks 2 and 3 are with the empty shuttle and leave the empty shuttle at the supply side of the loom. The shuttle then gets fresh weft, and pick 4 with the fresh weft is away from the supply side of the loom. Hence, the fresh weft is laid in the same shed as that which was open when detection occurred, since with a three harness loom in which the shedding progresses uninterruptedly and regularly the same shed is open at picks 1 and 4. Assume, however, that the weft fails when the shuttle is traveling away from the supply side of the loom, and before the shuttle passes the center fork. In such case there will be a different action because the weft-hammer then occupies a different position, being then near its forward position, substantially as shown in Fig. 14. This figure shows the actuator C lifted following such detection. As here shown the point of the dog D is behind the rear notch $a$ of the weft-hammer, while the hook F is raised so as to be back of and in the path of a fixed catch $d$, on the weft-hammer. Following this movement, the weft-hammer moves back and engages the hook F. This hook F is pivoted at 47 (Fig. 6) to an arm N, being yieldingly held in position thereon by a spring 48. This arm N has a lateral pin 52 which fits loosely in a hole at the upper end of the actuator C, as shown in Figs. 6 and 13. At its outer end this arm N is pivoted at 49 to a detent O, which in turn is pivoted at 50 to the slide I, and is pressed toward the oscillating ratchet H by a spring 51, which is shown in Fig. 12.

This hook normally occupies the position shown in Fig. 14, thereby engaging a shoulder $h$ (Fig. 15) on the rocking oscillating ratchet H and hence preventing its rotation by its spring 45. When, however, the weft-hammer on its backward movement engages the hook F and pulls it back, the detent O is pulled back to the position shown in Fig. 15, thus freeing the hook from the shoulder $h$ on the ratchet H, whereupon the said ratchet is swung on its pivot by its spring until it is stopped by the fixed shoulder 53 (Figs. 9, 10 and 15) on the slide I. This swing of the ratchet H thrusts the coupler G and dog D backwardly, this being permitted by the slot 32 in the arm actuator C which itself has been partly swung back by the pin connection 52 between it and the arm N.

As soon as the weft-hammer reaches its rear position and then moves forward, its hold on the hook F is released and both hook F and dog D then drop by gravity together with the actuator C. In the meantime, there has been another detection of weft absence due to the traverse of the empty shuttle and the dog D is again elevated while the weft-hammer is moving forward. This time, however, the dog engages the rear notch $a$ of the weft-hammer (as shown in Fig. 15) because of the rearward position to which the dog D has been moved by the swing of the ratchet H to the position shown in Fig. 15. During this first forward movement of the weft-hammer the dog D and the coupler G are moved forward to the position shown in Fig. 16, and the pawl K engages the notch $g$ in the ratchet H, as shown in Fig. 16. This partial swing of the ratchet H also brings its shoulder $h$ beneath the detent O and said detent is thrown into engaging position by means of its spring 51 (see Fig. 12). The weft-hammer then moves back a second time and forward a second time. As it moves forward a second time the actuator C and dog D are lifted (due to the continuing detecting action of the center fork which continues to detect during the idle flights of the empty shuttle) and this time the dog D engages the middle notch $b$ of the weft-hammer as illustrated in Fig. 17. Then, as the weft-hammer moves forward, the dog D and coupler G are moved forward to the position shown in Fig. 18, thus further rocking the ratchet H until its notch $e$ is engaged by the pawl K. The weft-hammer then moves back a third time and forward a third time. As it moves forward the third time the dog D is again raised by the detecting action of the center fork and this time, owing to its being held forward by the pawl K engaging the notch $e$, the dog D engages the forward notch $c$ of the weft-hammer, as shown in Fig. 19. Therefore, as the weft-hammer continues to move forward the dog D and coupler G are pushed forward, and as the coupler G is then engaging the shoulder 42 of the slide I, the slide I is moved forward, thus swinging the arm L and rocking the change shaft M so that the weft-supply mechanism is put into action and fresh weft is supplied to the loom. In this case, it will be noted that there are required three complete coacting forward movements of the weft-hammer between detection and replenishment, during which period the harnesses continue to run regularly and the empty shuttle to travel back and forth. This provides the necessary interval for the empty shuttle to make five traverses. Assuming that the weft fails on pick 1, with the shuttle moving away from the supply side, the following five picks 2, 3, 4, 5 and 6, are with the empty shuttle, and pick 6 leaves the shuttle at the supply side of the loom. Replenishment is then effected so that on pick number 7 the shuttle lays the fresh weft in the shed. With a three harness loom the same shed will be open at pick 7 and at pick 1 which was open when detection occurred so that the fresh thread is laid in the same shed as that which was first empty, thus matching the pick.

In the two instances which have been discussed, it has been assumed that the thread runs out before the shuttle reaches the center fork so that a partial pick less than half the width of the cloth is left in the shed. The first pick of fresh weft is laid in the same shed so that it has a partial pick and a full pick, which is permissible in some classes of fabrics. In case, however, the thread runs out after the shuttle has passed the center fork, then the detection will be at the next pick of the shuttle and the fresh weft will be laid in that shed. The result will be that there will occasionally exist sheds in which there is but a partial pick, but as this partial pick extends more than half the width of the cloth, the pick will be matched with sufficient accuracy to be permissible in some classes of fabrics. The weft-hammer, center-fork, the intervening mechanism, and the differential delaying mechanism constitute pick-matching devices operating on failure of weft in either direction of the pick with selective timing varied to correspond with the direction of the pick in which failure occurs and causing the first pick of fresh weft to be introduced into the proper shed to receive it. The timing is different depending on the direction of the pick when failure occurs; and the selection of one timing or the other depends upon the position of the weft-hammer when the starting shaft 24 is rocked. There is a single double acting weft-hammer which acts in one direction to free the hook O, from the ratchet H, and in the other to force the coupler G, forward. By the addition of teeth to the weft-hammer and to the ratchet, the mechanism can be adapted to a greater odd number of harnesses.

It is necessary that all parts of the differential delaying mechanism should be restored to their normal positions after replenishment has been effected, and the restoration is the same whichever way the shuttle is running when detection occurs. The starting shaft 24 is rocked to its normal idle position by means of the spring 41, Fig. 1. The center fork dagger 20 acts effectively on the lever 21 during only a portion of the forward movement of the lay (Figs. 4 and 5) and consequently it is necessary that the starting shaft should not be immediately restored to its normal position by its spring 41. Hence, a latch 37 is provided to hold the starting shaft 24 in its locked position with the actuator C, dog D and hook F elevated. This latch 37 is pivoted at its middle at 39 and its latching end is pulled down by a spring $f$ so as to engage a laterally projecting pin 38 (Fig. 5) on the lever 21, as shown in Fig. 4. When, however, the lay approaches front center, the center fork dagger 20 encounters the tail 40 of the latch 37, thereby swinging said latch and releasing the lever 21, the dagger is held from rising while depressing the tail 40, by the fixed guard 60. Thereupon, the spring 41 swings the starting shaft and the lever 21 to their normal positions. To positively insure the quick and immediate return of the starting shaft 24 to its normal position, in spite of any sluggishness in the spring 41, the starting shaft has an upwardly extending arm 58 (Figs. 13 and 14) which is struck by a finger 59 (Fig. 13) on the lay when the lay approaches front center. Hence, the starting shaft is positively restored at each forward beat of the lay to its normal position with the actuator C down whenever the starting shaft has been rocked to lift said actuator C by the detecting action of the center fork. This detecting action of the center fork occurs at every beat of the lay during the idle flights of the empty shuttle which occur between the initial detection of weft absence and the weft replenishment. Hence, whenever the lay reaches front center during this period the actuator C is pulled down, thus tending to release the dog D and the hook F from engagement with the weft-hammer. Each time that the slide I is moved forward to effect weft-replenishment, it is moved back to its normal position by the spring 61. When the pawl K is released from the notch $e$ of the ratchet H by the action of the fixed cam 44 (Figs. 10 and 11) the spring 45 swings the ratchet to its normal position where it is caught and held by the detent O. This movement of the cam restores the dog D to its normal position. The pivoted yielding connections of dog D, and hook F, allow them to ride over the weft-hammer when required.

I claim:

1. An automatic weft-replenishing pick-matching loom, provided with a weft-supplying mechanism at one side only and three harness and picking mechanims which continue their normal operations during weft-absence detection and weft-replenishment, said loom having, in combination, a change shaft governing the action of the weft-supplying mechanism; a single weft-absence detector consisting of a center-fork which detects weft-absence following the pick of the shuttle in both directions; a single double acting weft-hammer which makes one complete reciprocation to two picks of the shuttle, said weft-hammer having a catch and a series of notches; and a differential delaying mechanism between said weft-hammer and change shaft, said differential mechanism comprising (a) a main slide coöperating with the change shaft, (b) an oscillating spring-moved ratchet journaled in said slide, (c) a detent on the slide normally holding said ratchet against the stress of its spring, (d) a pawl carried by the slide and adapted to coöperate with the teeth of said ratchet, (e) a hook connected with the detent and adapted to engage with the catch of the backwardly moving weft-hammer, (f) a normally idle coupler connected with the ratchet, (g) a dog connected with the coupler and adapted to engage with the different notches of the weft-hammer when the hammer moves forward, whereby the ratchet is moved against its spring and eventually the coupler engages the slide to move it forward, and (h) an actuator controlled by the center-fork and acting to connect the hook or the dog with the weft-hammer depending upon the direction of the pick.

2. An automatic weft-replenishing pick-matching loom, provided with a weft-supplying mechanism at one side only and shedding and picking mechanisms which continue their normal operations between weft-absence detection and the action of the controlling means for the weft-supplying mechanism, said loom having, in combination, controlling means governing the action of the weft-supplying mechanism; weft-absence detecting mechanism which detects weft-absence following the pick of the shuttle in both directions; a single double acting weft-hammer which makes one complete reciprocation to two picks of the shuttle, said weft-hammer having a catch and a series of notches; and a differential delaying mechanism between said weft-hammer and controlling means, said differential mechanism comprising (a) a main slide coöperating with the controlling means, (b) an oscillating spring-moved ratchet journaled in said slide, (c) a detent on the slide normally holding said ratchet against the stress of its spring, (d) a pawl carried by the slide and adapted to coöperate with the teeth of said ratchet, (e) a hook connected with the detent and adapted to engage with the catch of the backwardly moving weft-hammer, (f) a normally idle coupler connected with the ratchet, (g) a dog connected with the coupler and adapted to engage with the different notches of the weft-hammer when the hammer moves forward, whereby the ratchet is moved against its spring and eventually the coupler engages the slide to move it forward, and (h) an actuator controlled by the detecting mechanism and acting to connect the hook or the dog with the weft-hammer depending upon the direction of the pick.

3. An automatic weft-replenishing pick-matching loom, provided with a weft-supplying mechanism at one side only and shedding and picking mechanisms which continue their normal operations between weft-absence detection and the action of the controlling means for the weft-supplying mechanism, said loom having, in combination, controlling means governing the action of the weft-supplying mechanism; weft-absence detecting mechanism which detects weft-absence following the pick of the shuttle in both directions; a moving catch and a moving series of notches and a differential delaying mechanism between said catch and notches and said controlling means, said differential mechanism comprising (a) an oscillating spring-moved ratchet, (b) a detent holding said ratchet against the stress of its spring, (c) a pawl adapted to coöperate with the teeth of said ratchet, (d) a hook connected with the detent and adapted to engage with said catch, (e) a normally idle coupler connected with the ratchet, (f) a dog connected with the coupler and adapted to engage with different ones of said notches, whereby the ratchet is moved against the spring and eventually the coupler acts to move said controlling means, (g) an actuator controlled by the detecting mechanism and acting to connect the hook or the dog with the catch or notches depending upon the direction of the pick.

4. An automatic weft-replenishing pick-matching loom having, in combination, differential delaying mechanism; controlling means for the replenishing instrumentalities governed thereby; a rocking spring-moved starting shaft; an actuator moved by said shaft and controlling said differential mechanism; a center-fork; a dagger controlled by said fork; a lever controlled by said dagger; a link connecting said lever and shaft; a spring latch locking said lever when moved by said dagger, said latch having a tail in the path of said dagger whereby it is released from said lever; an arm on said shaft; and a finger on the lay which strikes said arm and rocks the shaft to its normal position.

5. An automatic weft-replenishing pick-matching loom having, in combination, differential delaying mechanism; controlling means for the replenishing instrumentalities governed thereby; a rocking starting shaft; an actuator moved by said shaft and controlling said differential mechanism; a center-fork; a dagger controlled by said fork; a lever controlled by said dagger; a link connecting said lever and shaft; and a spring latch locking said lever when moved by said dagger, said latch having a tail in the path of said dagger whereby it is released from said lever.

6. An automatic weft-replenishing pick-matching loom having, in combination, differential delaying mechanism; controlling means for the replenishing instrumentalities governed thereby; a rocking spring-moved starting shaft; an actuator moved by said shaft and controlling said differential mechanism; a weft-fork; a dagger controlled by said fork; a lever controlled by said dagger; means connecting said lever and shaft; and a spring latch locking said lever when moved by said dagger, said latch having a tail in the path of said dagger whereby it is released from said lever.

7. A loom having, in combination, a weft-fork; a dagger controlled by said fork; a lever controlled by said dagger; and a spring latch locking said lever when moved by said dagger, said latch having a tail in the path of said dagger whereby it is released from said lever.

8. An automatic weft-replenishing pick-matching loom wherein replenishment is effected by supplying fresh weft to the shuttle, said loom having, in combination, controlling means for the replenishing instrumentalities; and pick-matching devices operating on failure of weft in either direction of the pick with selective timing varied to correspond with the direction of the pick in which failure occurs and causing the first pick of fresh weft to be introduced into the proper shed to receive it, said devices comprising detecting mechanism consisting of a center-fork adapted to detect for picks in both directions, and a single double-acting weft-hammer which occupies different coöperative positions at the time when detection occurs following picks in opposite directions.

9. An automatic weft-replenishing pick-matching loom having, in combination, controlling means for the replenishing instrumentalities; and pick-matching devices operating on failure of weft in either direction of the pick with selective timing varied to correspond with the direction of the pick in which failure occurs and causing the first pick of fresh weft to be introduced into the proper shed to receive it, said devices comprising detecting mechanism adapted to detect for picks in both directions, and a single double-acting weft-hammer which occupies different coöperative positions at the time when detection occurs following picks in opposite directions.

10. An automatic weft-replenishing pick-matching loom having, in combination, controlling means for the replenishing instrumentalities; and pick-matching devices operating on failure of weft in either direction of the pick with selective timing varied to correspond with the direction of the pick in which failure occurs and causing the first pick of fresh weft to be introduced into the proper shed to receive it, said devices comprising detecting mechanism adapted to detect for picks in both directions, and a single weft-hammer which occupies different coöperative positions at the time when detection occurs following picks in opposite directions.

In witness whereof, I have hereunto signed my name in the presence of two subscribing witnesses.

ALONZO E. RHOADES.

Witnesses:
JESSE D. BROMLEY,
EDWARD DANA OSGOOD.